United States Patent Office 3,235,556
Patented Feb. 15, 1966

3,235,556
ALKYL ISOQUINOLINIUM SALTS OF AROMATIC CARBOXYLIC ACIDS
Reginald L. Wakeman, Philadelphia, Pa., and Joseph F. Coates, Washington, D.C., assignors, by mesne assignments, to Millmaster Onyx Corporation, New York, N.Y., a corporation of New York
No Drawing. Filed Mar. 5, 1963, Ser. No. 262,836
10 Claims. (Cl. 260—286)

The object of the present invention is the preparation of microbiologically active compounds possessing relatively low water solubility, by the reaction of N-alkyl isoquinolinium quaternary ammonium compounds having 8 to 18 carbon atoms in the alkyl radical with the free acid or salts of mono, di or polycarboxylic acids of the aromatic series.

It has generally been recognized that quaternary ammonium compounds which are microbiologically active are incompatible, i.e., lose their activity in the presence of anionic materials.

We have discovered that, contrary to general belief, the reaction of microbiologically active water-soluble quaternary ammonium compounds of the alkyl isoquinolinium type with aromatic mono or polycarboxylic acids or their salts and corresponding thio acids and their salts yields products which, in many cases, are equally as active, microbiologically, as the parent quaternary ammonium compounds from which they are derived. In some cases they are more active. As suitable aromatic carboxylic acids we may employ any mono or polycarboxylic acid compound containing an aromatic nucleus, such as a benzene or naphthalene ring, with or without substituent radicals derived from a hydrocarbon, and with or without other substituent groups such as chloro, nitro, amino, hydroxyl, and the like. Examples of such acids are benzoic acid, the toluic acids, phthalic acid, isophthalic acid, terephthalic acid, hemimellitic acid, trimellitic acid, trimesic acid, pyromellitic acid, mellitic acid, diphenic acid, naphthoic acid, naphthalene acetic acid; the thio analogs of said acids; and all said acids bearing alkyl, alkaryl, aralkyl, cyclo alkyl, chloro, bromo, iodo, hydroxyl, nitro, amino, sulfo, and ether groups.

The aromatic acids are preferably reacted in the form of their water-soluble salts, such as their sodium, potassium or ammonium salts, or in the form of the free acid if solubility relationships permit.

Quaternary ammonium compounds useful in this invention correspond to the formula

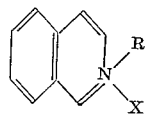

wherein X is a halogen atom, such as bromine or chlorine or a hydroxyl group and R is an alkyl radical having from 8 to 18 carbon atoms.

A further feature of our invention is to be found in the new physical properties, especially the low water solubility of our preferred compounds, generally not in excess of 3 parts by weight per 100 parts of the solution at 22° C., so that they are especially useful in applications wherein the known water-soluble quaternary ammonium compounds are washed away or are physically incompatible or unsatisfactory because of their high water solubility.

The compounds may be prepared by mixing aqueous solutions of the quaternary ammonium salts with a salt of any of the aforementioned acids, their analogs or homologs. In the case of polycarboxylic acids, they may be employed in the form of their completely neutralized salts or in any desired degree of neutralization, i.e., mono, di, trisodium salts, or the like. After thoroughly mixing, the organic product layer is separated from the aqueous layer (as with a separatory funnel) since two distinct phases are formed. Separation may be facilitated by the addition of an organic solvent immiscible with water. The product layer may be washed with water to remove any residual by-product salt or unreacted materials. The solvent, if any, may be evaporated and the product air or vacuum dried to a paste, wax, oil or solid.

It is not necessary to use an aqueous medium. Any solvent or solvent mixture in which the starting materials are soluble will be satisfactory. Non-aqueous solvents facilitate the separation of by-product inorganic salt and reduce the need for vacuum drying to get an anhydrous product. When a non-aqueous medium is employed, it is usually necessary to add a small amount of water to facilitate ionic reaction.

The product may be used, if desired, without drying since any entrapped water is irrelevant to the microbiological activity of the compounds. In other applications, removal of water may be essential for reasons not related to biological activity.

An alternative method for the preparation of compounds especially applicable to the treatment of fabric, ropes, net, woven and non-woven fabric and reticulated or convoluted materials, involves a two-step process. In the first step, the material is passed through a bath containing the anionic moiety. Excess solution is removed by methods well known to those skilled in the art. The treated material is then passed through a second bath wherein the concentration of quaternary ammonium compounds is such that the material pickup will result in an equivalent amount of quaternary ammonium compound reacting with the anionic moiety, depositing the product in the most intimate way on the surface and in the interstices, convolutions and reticulations of the material.

The adjustment of solution concentration to achieve the required pickups are well known to those skilled in the art. The order of treatment may be reversed without affecting the biological activity or durability of the product on the material. They may be formulated as water dispersions by dissolving them in a water-miscible organic solvent such as acetone or methanol and diluting with water, or by dissolving them in emulsifiable oils such as, for example, sulfonated castor oil or pine oil and diluting with water. In preparing aqueous dispersions, emulsifying agents such, for example, as ethylene oxide condensates of alkyl phenols may be used with or without organic solvents.

It is surprising that the compounds of this invention exhibit high microbiocidal activity despite their relative insolubility in water. Because of their usual combination of physical and microbiological properties, they can be used to impart laundry-resistant anti-microbial characteristics to textiles. They can also be used as the active agent in anti-mildew finishes for textiles which are resistant to leaching with water.

Although the compounds have low water solubility, they are compatible with various organic solvents, plasticizers and high molecular weight compounds. Consequently, they may be incorporated as anti-microbial agents in synthetic resins and plastic. The compounds are compatible with natural and synthetic rubber latices. Therefore, they may be used to prepare bacteriostatic films and molded objects deposited from such latices.

The compounds can be incorporated into cutting and grinding fluids without precipitation. Also, they blend well with non-ionic and anionic surface-active agents. In such compositions they retain their microbiological activity.

It will be understood that the properties of the products described herein will vary depending upon the nature of the alkyl isoquinolinium compound used in their preparation as well as the carboxylic acid compound reacted therewith.

The chemical, physical and bilogical properties of the products of our invention make them especially appropriate for the following applications when suitably incorporated in active amounts in an appropriate vehicle, binders, medium or substrate:

(1) Mildewproofing fabric, canvas, ropes, textiles, awnings, sails, tenting and other woven and non-woven reticulated materials
(2) Paint mildewstats
(3) Jet plane fuel additive to control growth of microorganisms
(4) Odor preservative agents for clothes and shoes
(5) Mildew retardant and odor suppressant for shoes and other leather products
(6) Topical antiseptics
(7) Antidandruff agents
(8) Disinfection agents for hair and gut of man and beast
(9) Bacteriostatic furniture dressing
(10) Surface finishes for stone, plaster, tile, cement, brick and other inorganic building materials, to retard growth of microorganisms, fungi, mold and algae
(11) Wool preservative
(12) Plant and tree spray to combat fungi
(13) Antimycotic agents for soap wrappers
(14) Self-sanitizing brushes
(15) Mildewproofing agent in and on plastic and film
(16) Mildewproofing of cellulosics, cardboard, fibreboard, paper and cordage
(17) Contact biostat for application to film, waxes and cloth to preserve cheese, meats, vegetables and other food products
(18) Algal inhibition, especially on surfaces and in solution where low foaming is desirable
(19) Paper pulp slime control
(20) Sanitizing agent for rug, carpet, curtains
(21) Egg preservation
(22) Adhesive preservation
(23) Preservation of latex paints The microbiological activity of our compounds has been evaluated for microbiological stasis by the Standard Tube Dilution Test, the technique for which is common knowledge to those skilled in the art. A Difco Bacto CSMA Broth #0826 was used in the study. This test is used to determine the lowest concentration of microbiologically active compounds which will inhibit the growth of the organism in question. For wide range of applications, the inhibition of growth rather than outright kill is satisfactory.

Briefly put, the Tube Dilution Test consists in placing 9 cc. of the CSMA broth in a test tube which is then sterilized in an autoclave. One cc. solution of the microbiologically active compound at an appropriate concentration is added to the test tube which is then inoculated with 0.1 cc. of a twenty-four hour old culture of the organism under study. The test tube is then incubated at 37° C. for forty-eight hours and observed for bacterial growth.

The same procedure is followed for fungi. In such tests, however, the tubes are incubated for fourteen days at a temperature suitable for optimum fungal growth, usually 25° C.

The invention is illustrated by, but not restricted to, the following examples:

EXAMPLE I

A stock solution was prepared containing 10 weight percent of sodium benzoate. An aliquot of the solution, containing 0.035 equivalent of sodium benzoate, was vigorously agitated while a chemically equivalent amount of a commercial grade of lauryl isoquinolinium bromide (Onyx Chemical Corporation; Isothan Q-75) in the form of a 10 weight percent solution was slowly added. The agitated mixture was then poured into a separatory funnel. The mixture separated into two phases. The organic product layer was removed and vacuum dried to yield a dark brown paste in 90 percent theoretical yield. The product was lauryl isoquinolinium benzoate.

EXAMPLE II

The lauryl sioquinolinium bromide of the preceding Example I was replaced by 0.035 equivalent of n-octyl isoquinolinium bromide in a 10% aqueous solution. The reaction mixture was extracted with toluene and separated from the aqueous medium in this manner. After vacuum-drying, an 80 percent yield of n-octyl isoquinolinium benzoate was obtained as a brown, very viscous fluid.

EXAMPLE III

A solution was prepared containing 10 weight percent of the disodium salt of terephthalic acid. To a vigorously agitated aliquot of this solution containing 0.0946 equivalent weight of the compound was added the chemically equivalent amount of a 10 percent solution of lauryl isoquinolinium bromide. The mixture was poured into a separatory funnel and shaken, after which it was allowed to stand until it separated into two phases. The organic product layer, a brown oil, was drawn off, entrapped water removed by heating and the product was vacuum dried to yield a brown paste of di(lauryl isoquinolinium) terephthalate in 71 percent theoretical yield.

If desired, an equivalent amount of lauryl isoquinolinium chloride may be used instead of the bromide of the preceding examples.

EXAMPLE IV

An aliquot of a 10% stock solution of tetra sodium pyromellitate, containing 0.03 equivalent of this salt, was vigorously agitated while a chemically equivalent amount of lauryl isoquinolinium bromide in the form of a 10 weight percent solution was slowly added. The agitated mixture was then poured into a separatory funnel. The mixture separated into two phases. The organic product layer was removed and vacuum dried to yield a dark brown paste in 94 percent theoretical yield, consisting essentially of tetra(lauryl isoquinolinium) pyromellitate.

EXAMPLE V

By reacting 0.03 equivalent of myristyl isoquinolinium chloride in 10% aqueous solution with 0.03 equivalent of the 10% stock solution of tetrasodium pyromellitate of Example IV, a 90 percent yield of tetra(myristyl isoquinolinium) pyromellitate was obtained as a dark brown paste.

Tetra(cetyl isoquinolinium) pyromellitate and tetra (stearyl isoquinolinium) pyromellitate were obtained quantitatively in the form of dark brown wax-like masses by replacing the preceding myristyl quaternary ammonium compound with an equimolecular amount of cetyl isoquinolinium bromide and stearyl isoquinolinium bromide, respectively. After precipitation of the water-insoluble alkyl isoquinolinium pyromellitates, they are extracted from the aqueous phase by means of benzene and then vacuum dried.

EXAMPLE VI

Corresponding products were made from the sodium salts of ortho, meta and para toluic acids by reaction with lauryl isoquinolinium bromide using a procedure similar to that described in Example IV. The compounds, i.e., lauryl isoquinolinium o-, m-, p-toluates, were obtained in the form of dark brown pastes in 99%, 90% and 72% yields, respectively.

A considerable number of other compounds made by methods similar to those of Examples I to VI were prepared in stoichiometrically equivalent amounts. These, compounds, together with several of those of the preceding examples, are listed in Table 1 which also shows their solubility in water (given in parts per one hundred parts solution at 22° C.), and their microbiological activity, evaluated for stasis by the Standard Tube Dilution Test previously described, using three different organisms, i.e.: *Staphylococcus aureus*, *Salmonella typhosa*, and *Aspergillus niger*. All of the products tested were found to be microbiologicially active wtih respect to these three organisms.

*Table 1*

PROPERTIES OF THE REACTION PRODUCTS OF SODIUM SALTS OF AROMATIC CARBOXYLIC ACIDS WITH LAURYL ISOQUINOLINIUM BROMIDE

| Reacted carboxylate | Product solubility at 22° C. (g./100 g. soln.) | Reciprocal of static dilution of product vs.— | | |
|---|---|---|---|---|
| | | S. aureus | S. typhosa | A. niger |
| Sodium benzoate | 0.13 | $10^5$ | $10^4$ | $10^3$ |
| Sodium o-toluate | 0.18 | $10^5$ | $10^4$ | $10^3$ |
| Sodium m-toluate | 0.14 | $10^5$ | $10^4$ | $10^4$ |
| Sodium p-toluate | 0.21 | $10^5$ | $10^4$ | $10^4$ |
| Sodium 2,4-dichlorbenzoate | 2.6 | $10^6$ | $10^5$ | $10^5$ |
| Sodium 3,4-dichlorbenzoate | 0.12 | $10^6$ | $10^5$ | $10^4$ |
| Sodium 3-nitro-4-chlorbenzoate | 0.14 | | | $10^4$ |
| Sodium o-aminobenzoate | 0.38 | $10^5$ | $10^4$ | $10^4$ |
| Sodium p-aminobenzoate | 0.92 | $10^5$ | $10^5$ | $10^5$ |
| Monosodium salicylate | 0.12 | $10^6$ | $10^4$ | $10^4$ |
| Disodium salicylate | 0.04 | | | |
| Disodium 5-chlorosalicylate | 0.10 | $10^6$ | $10^5$ | $10^4$ |
| Monosodium sulfosalicylate | 0.15 | $10^7$ | $10^6$ | $10^5$ |
| Disodium sulfosalicylate | 0.11 | $10^7$ | $10^5$ | $10^4$ |
| Disodium terephthalate | 0.68 | $10^6$ | $10^4$ | $10^5$ |
| Trisodium 4-sulfophthalate | 2.0 | $10^5$ | $10^5$ | $10^4$ |
| Tetrasodium pyromellitate | 0.18 | $10^5$ | $10^5$ | $10^5$ |
| Sodium 3,8-dihydroxy 3-naphthoate | 0.05 | $10^5$ | $10^4$ | $10^4$ |
| Sodium benzilate | 0.09 | $10^6$ | $10^6$ | $10^5$ |
| Disodium 2-terephthaloyl benzoate | 0.04 | $10^5$ | $10^4$ | $10^3$ |
| Monosodium salt of diphenolic acid [1] | 0.04 | $10^5$ | $10^5$ | $10^4$ |
| Disodium salt of diphenolic acid [1] | 0.03 | $10^5$ | $10^5$ | $10^5$ |
| Trisodium salt of diphenolic acid [1] | 0.02 | $10^5$ | $10^4$ | $10^4$ |
| | | Zones of inhibition [2] | | |
| Sodium salt of polyether acid N-3 [3] | 0.01 | 6 mm. vs. *S. aureus* | | |
| Sodium salt of polyether acid B-4 [4] | 0.00 | 6 mm. vs. *S. aureus* | | |
| Sodium salt of polyether acid E-3 [5] | 0.00 | 4 mm. vs. *S. aureus* | | |
| Sodium thiobenzoate | 0.38 | $10^6$ | $10^5$ | $10^5$ |
| Sodium thiosalicylate | 0.08 | $10^6$ | $10^5$ | $10^5$ |
| Sodium p-aminophenyl mercapto acetate | 0.21 | $10^5$ | $10^5$ | $10^5$ |

[1] S. C. Johnson's Trade Name:

γ, γ-bis(p-hydroxyphenyl) pentanoic acid,

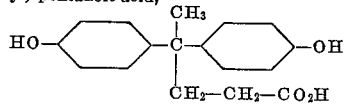

[2] Agar Cup Plate method as described by G. F. Reddish, "Antiseptics, Disinfectants, Fungicides, and Chemical and Physical Sterilization," 9th ed. Lea and Febiger, Philadelphia 1957, page 199.
[3] N-3: Condensation product of diphenolic acid and dichlorethy ether.
[4] B-4: Condensation product of diphenolic acid and dichloro butane.
[5] E-3: Condensation product of diphenolic acid and epichlorhydrin.

EXAMPLE VII

A 1.25% solution of the product of Example IV was padded onto a cotton duck, resulting in an 80% wet pick-up. The fabric was air dried and subsequently tumble dried for 30 minutes at 110° F. One inch strips of thus treated canvas were subjected to the standard soil burial test as described in the 1961 Technical Manual of the American Association of Textile Chemists and Colorists, page 159 et seq. After six weeks of burial, according to this test, the treated samples showed very little visual evidence of attack and retained 60% of their initial tensile strength, as determined by comparison with untreated canvas.

A similar test was run with comparable results by padding onto the cotton duck a 1% solution of tetra sodium pyromellitate, drying and then padding on a 2% solution of lauryl isoquinolinium bromide. The product of Example IV was thus formed in situ on the fabric and upon treatment with the respective solution showed a pickup of 80%. After precipitation of the product of Example IV on the cotton duck, the fabric was rinsed with water at room temperature, dried and tumble dried for 30 minutes at 110° F. as before. The results were comparable to those obtained by padding the solution of the product of Example IV directly on the duck, except that the tensile strength of the treated fabric in this case amounted to 80% of the tensile strength of the untreated material.

Certain products of this invention are particularly useful in combatting plant diseases. Di(lauryl isoquinolinium) terephthalate, for example, is particularly effective in exhibiting fungi toxicity with respect to *Ceratocystis ulmi* (Dutch elm disease).

When utilizing the product of Example III for the treatment of elm saplings infested with *Ceratostomella ulmi*, ¼" diameter holes were drilled spirally in the trunks to a depth of about ¾" and spaced apart at intervals of about six inches, starting from the ground and going upwards to a height of five to six feet. The product of Example III was physically admixed with eight times its weight of ordinary sugar, then the holes were plugged with this mixture of sugar and microbiologically active quaternary ammonium derivative. After observing the trees during a summer season, the blight was found to be arrested and the trees appeared to be in good health.

An aqueous suspension of the product of Example III brushed or sponged onto the bark of the saplings was also found effective in arresting the development of Dutch elm disease.

The products of this invention may also be dissolved or suspended in water and sprinkled onto rosebush leaves, in order to prevent the development of black spot and powdery mildew, without deleterious effect to the foliage.

The inhibition of algae development by means of the products of this invention is particularly useful in the treatment of waste industrial waters, especially in the treatment of water which is recirculated through industrial cooling towers where the development of foam can militate against the use of certain other types of algicides. Thus, for example, lauryl isoquinolinium paratoluate dissolved in the cooling water to the extent of 10 p.p.m. prevents the growth of both green and blue green algae and does not give rise to foam either upon addition to the water or upon circulation thereof.

We claim:
1. Lauryl isoquinolinium benzoate.
2. n-Octyl isoquinolinium benzoate.
3. Di(lauryl isoquinolinium) terephthalate.
4. Tetra(lauryl isoquinolinium) pryomellitate.
5. Tetra(myristyl isoquinolinium) pyromellitate.
6. Tetra(cetyl isoquinolinium) pyromellitate.
7. Tetra(stearyl isoquinolinium) pyromellitate.
8. Lauryl isoquinolinium toluate.
9. Lauryl isoquinolinium γ,γ - bis(p - hydrophenyl) pentanoate.

10. A microbiologically active isoquinolinium compound having the structure

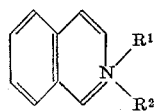

wherein $R^1$ is an alkyl of 8 to 18 carbon atoms and $R^2$ is the residue of an aromatic carboxylic acid, the water solubility of said compound being not in excess of 3 parts by weight per 100 parts of the solution at 22° C.

References Cited by the Examiner
UNITED STATES PATENTS 2,295,504  9/1942  Shelton _____ 260—286
2,435,458  2/1948  Mosher et al. _____ 260—286

NICHOLAS S. RIZZO, *Primary Examiner.*